United States Patent Office 3,488,168
Patented Jan. 6, 1970

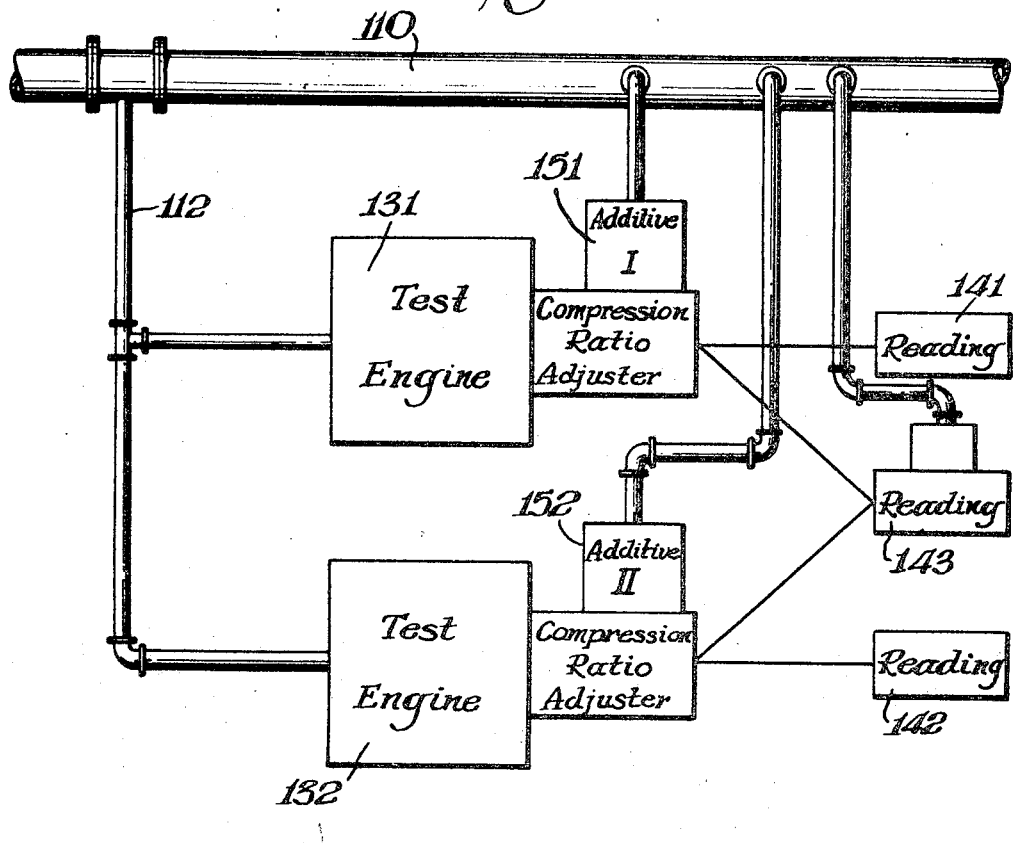

3,488,168
AUTOMATIC FUEL HANDLING
William C. Ludt, Yonkers, and John T. Jones, Ardsley,
N.Y., and Warren E. Green, Baton Rouge, La., assignors to Ethyl Corporation, New York, N.Y., a corporation of Virginia
Filed Aug. 9, 1966, Ser. No. 577,560
Int. Cl. C10l 1/10
U.S. Cl. 44—2                                    11 Claims

ABSTRACT OF THE DISCLOSURE

Automatic pipeline diversion of fuels is controlled by knock testing engine which can be remotely operated and warn of failure to operate. Where fuels in pipeline are not suitable for engine, they can be automatically diluted with a standard fuel that can have low volatility or be a pure chemical. Two knock testing engines can be simultaneously used to separately determine research and motor octane numbers from which road index numbers can be automatically computed.

---

Figure 1:
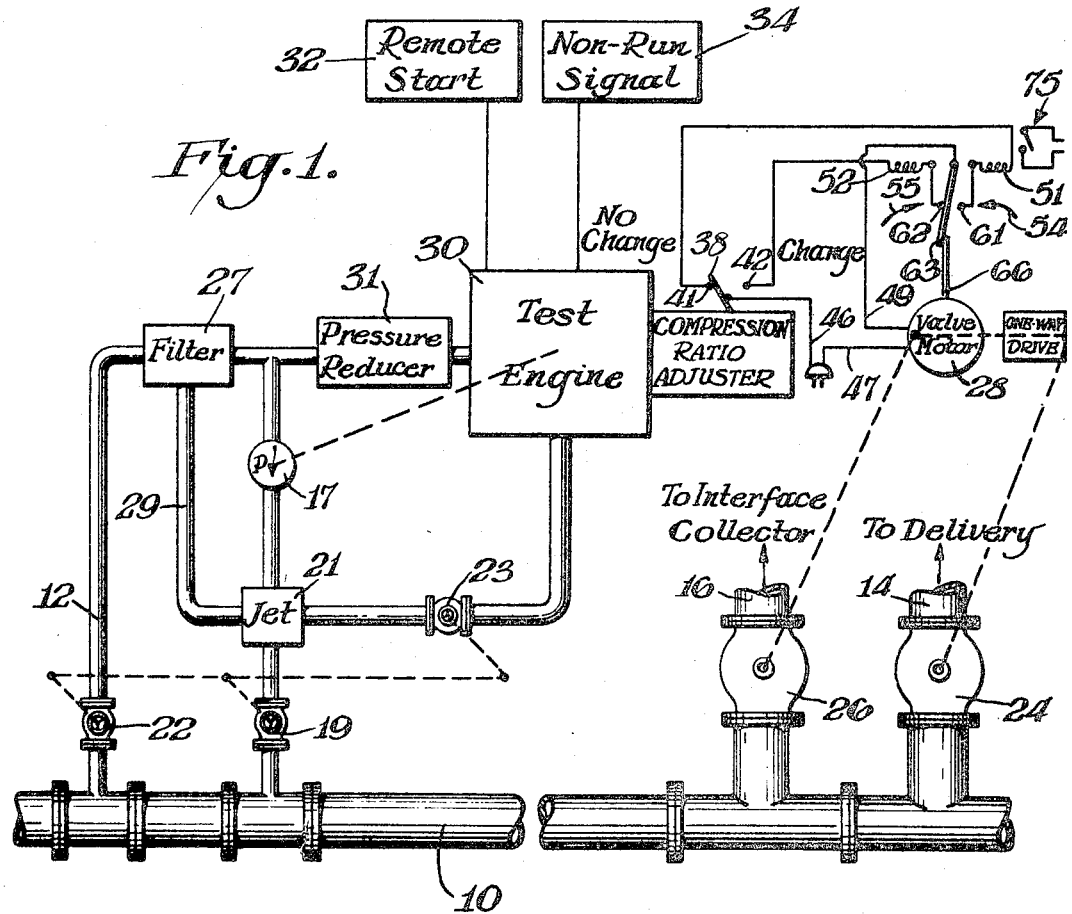

This invention relates to the handling of fuels such as gasolines, more particularly to such handling in a highly automated manner.

Among the objects of the present invention is the provision of novel apparatus that handles fuels so that they require very little attention from personnel, and the handling is effected with very little delay.

The foregoing as well as additional objects of the present invention will be more fully understood from the following description of several of its exemplifications, reference being made to the accompanying drawings wherein:

FIG. 1 is a plan view, partly schematic, of a pipeline control apparatus typical of the present invention; and FIG. 2 is a similar view of a gasoline testing apparatus.

According to the present invention an automatic pipeline control has an automatic knock-measuring apparatus including a test engine, remotely controlled starting means for the engine, and remote signal structure connected to generate a signal when the engine fails to run after the starting means is operated.

Whether or not the automatic control includes the signal generating structure, it can have valve-operating structure connected to a pipeline-diverting valve to automatically divert pipeline flow and/or to automatically shift the diversion in response to knock-measurement signals.

The automatic knock-measuring apparatus can be connected to automatically divert pipeline flow when a change in knock intensity is measured and to automatically shift the diversion when the knock measurement stops changing. Alternatively the pipeline flow can be automatically switched only once for each continuous change in knock measurement.

The control can also have automatic stopping means connected to stop the engine in response to alternate or successive operations of the valve-operating structure.

The knock-measuring apparatus of the present invention can include a knock-testing engine connected to operate valve means for withdrawing samples from the pipeline. The engine can additionally or alternatively be connected to operate pump means for withdrawing samples from the pipeline and returning excess to the pipeline.

Another aspect of the present invention involves the use of two test engines to simultaneously measure different characteristics of fuels. One such engine can, for example measure research octane number while the other measures motor octane number. The automatic apparatus of the present invention can also include a computer that automatically computes a road octane index value from the research and motor numbers. The respective engines can be used to control blending of fuels so as to simultaneously meet research and motor number specifications. The research measurement can, for example, control the addition of an antiknock additive like tetraethyllead to the blend, while the motor measurement can be used to control the addition to the blend of a gasoline stock that has a high motor octane number. Alternatively the respective engines can control the blending of two different antiknocks, as for example tetraethyllead and tetramethyllead.

FIG. 1 of the drawings illustrates an automatic pipeline control pursuant to the present invention. The pipeline is here represented at 10 as having a sampling outlet 12 to a test engine 30, and discharge lines 14, 16. The sampling outlet 12 can be valved as at 22 as a safety precaution, if the fuel-intake system of the engine cannot be relied on to shut off the inflow of fuel when the engine is not running. Discharge lines 14 and 16 have control valves 24, 26 respectively shown as connected for operation by a single valve motor 28.

Test engine 30 can be an automatically operated engine of the type described in prior applications Ser. No. 205,-015 filed June 25, 1962 (now U.S. Patent 3,383,904 granted May 21, 1968); Ser. No. 299,583 filed Aug. 2, 1953 (now abandoned); and Ser. No. 377,192 filed June 23, 1964, although it is shown in FIG. 1 as provided with a remote starting control 32 and a non-run signal indicator 34.

The remote starting control 32 can merely be a cranking arrangement in which an electric motor is relay-operated from a remote relay trigger switch to crank the test engine. The ASTM test engines are usually connected to standard 60-cycle, 3-phase electric motors which are in turn connected to the conventional power line when the test engine is in use. When such engines are not running their electric motor are disconnected from the power line as by deactivation of a relay locking circuit energized by the current produced when the engine operates. Connecting the electric motor to those lines will start the electric motor which will in turn crank the engine. A separate ignition switch can be used to stop the engine as by grounding the primary winding of the magneto that generates the electric current required for ignition in the engine.

The remote start 32 enables the automatic system of FIG. 1 to be operated from a remote location so that it is not necessary for any personnel to be present at the location where the pipeline is to be controlled. Non-run signal 34 can merely be a circuit running to a thermocouple in the exhaust of the test engine, or to an ammeter in the connection between the starting motor and the supply line, to show when the engine is running. This signal can be in the same remote location as the remote start 32 so that anyone operating the remote start can readily determine that the test engine is operating.

In the construction of FIG. 1 the test engine has a compression ratio adjuster 36 which is used to do all the controlling operations. As shown more fully in FIG. 7 of Ser. No. 205,015, the compression ratio adjuster preferably cooperates with a delay relay that switches the time constant of the amplifier used in the ASTM signal measuring circuit and such a delay relay can be arranged in the present FIG. 1 to operate a switch armature 38. The delay relay is so arranged that it normally holds the armature 38 against the left-hand contact 41 when the compression ratio of the test engine is not being changed, but the armature is tripped away from contact 41 and against contact 42, when the test engine operates in such a way that the compression ratio undergoes any adjustment that runs continuously for more than two to four seconds.

Contact 41, which is labeled the "No Change" contact, is connected through a winding 51 of valve motor 28 to a fixed contact 61 of the toggle-type limit switch 60. Contact 42, which is labeled the "Change" contact, runs through a different winding 52 of the valve motor 28 to another fixed contact 62 of toggle-switch 60. Winding 51 is arranged to cause the valve motor to rotate in counterclockwise direction indicated by curved arrow 54, and winding 52 is connected to cause the motor to rotate in the opposite direction as shown by curved arrow 55. The balance of the valve motor energizing circuit includes power supply leads 46, 47, one connected to armature 38, the other directly to the valve motor, along with a connector 49 from the valve motor to armature 63 of the toggle-switch 60. This armature 63 is further arranged to be mechanically tripped against contact 61 or 62 by an arm 66 rotated by the valve motor through one complete revolution.

In the illustrated position arm 66 has been rotated in a counterclockwise direction as far as it will go, and has tripped armature 63 against contact 62. Arm 66 is rotated from this position in clockwise direction when the valve motor operates to change the valving. When such a change is completed the arm 66 will push against armature 63 from its left, removing it from against contact 62, and tripping it to its right into engagement with contact 61.

A one-way drive connection 69 can be provided in the linkage between valve motor 28 and one of the valves 24, 26 so that these two valves need not always be simultaneously operated. The one-way drive connection can be made remotely controlled so that a remote switch, which can be in the same location as remote start 32 and non-run signal 34, can lock the connection to make it a two-way drive. Valve 24 can be a ball valve for example, so that it can be turned on and off by rotating its ball in one direction.

The construction of FIG. 1 also includes a pump 17 that operates the sampling flow and is in turn operated by the test engine. The sampling valve 22 can be automatically opened when the test engine operates, as by extra contacts on the relay that is locked in when the test engine is running. In the illustrated embodiment the sampling line includes a sampling return valve 19 simultaneously operated with valve 22, so that the fuel can be rapidly moved through the sampling circuit faster than is needed for operating the test engine. This reduces sampling lag. A jet 21 in the output of pump 17 scavenges carburetor overflow from the test engine for return to the pipeline 10, and a backflow preventing valve 23 can be in the scavenging line and operated simultaneously with valves 22 and 19 to protect the equipment. A filter 27 is desirable in the sampling line 12, preferably of the self-cleaning type with a cleaning by-pass 29 connected to jet 21. It is also helpful to have a pressure reducer 31 in the sampling line 12 so that the engine's carburetor does not have to control fuel at excessive pressures.

In operation the apparatus of FIG. 1 will automatically control the diversion of flow through pipeline 10. For example, the pipeline might be delivering premium gasoline followed by a regular gasoline. Due notice is received of the time the interface between the two gasolines is expected to reach the location of the control. Valve 24 is meanwhile in its open condition with pipeline contents being delivered out through conduit 14. Valve 26 is in its fully closed position.

The test engine 30 is started far enough in advance of the interface passage time to allow the test engine to come to equilibrium running on the fuel going through sampling line 12. During this interval of warm-up, the operation of armature 38 can be disabled as by a separate time delay (not shown) so that the armature remains in engagement with contact 41.

After warm-up the compression ratio of the test engine has adjusted itself to the value that corresponds with the requirements of the premium gasoline being sampled. There will accordingly be no significant changes of compression ratio, assuming the flowing premium gasoline is maintained at fairly uniform composition. Whatever changes there are in the premium fuel as it flows will, if anything, only involve minor compression ratio changes and these will be completed by operation of the compression ratio change motor for not over about one second.

When the interface reaches the sampling line there will be a rapid change in gasoline composition and a more pronounced change in compression ratio adjustment. As soon as a compression ratio adjustment requires about two seconds of operation of the compression ratio adjusting motor, armature 38 will be pulled away from contact 41 and against contact 42. This completes the energizing circuit for the valve motor through its winding 52. The valve motor accordingly rotates in clockwise direction, closing valve 24 and simultaneously opening valve 26. At the completion of this valve changing operation, arm 66 trips toggle armature 63 up away from contact 62 and against contact 61. This opens the energizing circuit for valve motor 28 so that valves 24, 26 stay in their shifted position. The liquid of the interface then flows out through conduit 16 to an interface collector which can be a convenient storage tank or tank truck.

As the interface continues to pass the control station, the proportion of regular gasoline in the interface increases and the compression ratio adjuster keeps on undergoing substantial changes. When the interface has completely passed, only regular gasoline will be flowing past the control station and as soon as the regular gasoline has flushed through the sampling line 12, the test engine will begin to come to equilibrium with the regular gasoline and the compression ratio will stop changing. This will permit the armature 38 to fall back against contact 41 and away from contact 42. Inasmuch as the toggle armature 63 is now engaging contact 61, this return of armature 38 energizes the valve motor again, this time through its winding 51. The valve motor is accordingly rotated in counterclockwise direction, closing the interface valve 26. One-way drive connector 69 does not transmit this valve motor actuation to valve 24 so that the latter valve remains closed.

While the valve motor 28 is being energized through winding 51, a magnetically operated shut-off switch 75 can be actuated as a result of the current flow through that winding to disable the ignition circuit in the test engine, causing the test engine to stop firing. The switch can if desired also open the circuit from the starting motor to its electric line. The shut-off switch 75 will remain in its shut-off position during the entire operation of the valve motor in the counterclockwise direction, giving the test engine sufficient time to coast to a stop. At the end of the valve motor's counterclockwise operation, toggle armature 63 is pushed away from contact 61 and back against contact 62. This opens the energizing circuit for the valve motor and also terminates the operation of the shut-off switch 75. However, the test engine is now stopped and will not start again until the remote start is actuated.

At the remote location where the "Remote Start" and "Non-Run Signal" are situated, there can also be an indicator to show the condition of valves 24, 26, so that the interface diversion can be observed. A remote indicator can also be provided to show the compression ratio of the test motor and thereby monitor the operation of the test engine.

The test engine 30 need not have any arrangement for automatically adjusting the fuel-air ratio setting of its carburetor. Such automatic adjustment is described in the applications referred to above, and in those arrangements that adjustment will automatically come into play during the warm-up period after the compression ratio adjuster has arrived at a first equilibrium value. Each fuel-air ratio adjustment generally takes an appreciable time, of the order of two minutes or so, and accordingly lengthens the time required to prepare for the interface passage.

Once the interface arrives, the compression ratio adjuster undergoes changes, and there is very little lag in this response. About ten seconds or even less after a change in fuel reaches the carburetor of the test engine, the compression ratio adjusted reacts. It is accordingly desirable to have the sampling line 12 as short as possible in addition to having the sample flow very rapid. With an extremely short sampling line the surplus fuel sampling and return is not essential and can be eliminated leaving only the filter 27 and pressure reducer 31. It is safer, however, to keep the test engine far enough from the pipeline to minimize the hazard that leaks would otherwise introduce.

The commencement and continuance of operation by the compression ratio adjuster will keep the automatic fuel-air ratio adjustment from taking place if the latter feature is retained in the apparatus. There is accordingly no interruption in the interface diversion whether or not the automatic fuel-air adjustment is retained.

Omission of the automatic fuel-air ratio adjustment calls for keeping that ratio at some predetermined value, such as 1:14.5, which can be selected as suitable for all fuels likely to be encountered. This might not be the ratio at which any of the fuels give their maximum knock, but operation at maximum knock is only needed when octane numbers are to be determined. In general, different fuels sent successively through a pipeline will give different knock intensities in the conventional test engine at any specific fuel-air ratio and given compression ratio, so that interfaces are readily and accurately diverted by the apparatus of FIG. 1, whether or not the automatic fuel-air ratio adjustment feature is used. Where successive fuels are very close in octane rating, as for example when they are both regular gasolines, there is no need to separate them.

The apparatus of the present invention is sufficiently accurate to allow the sampling stream to be diluted with as much as twenty times its volume of standard fuel as by means of a proportioning mixer without hiding an octane rating change of as little as five numbers in the pipeline stream, and such diluted interfaces are faithfully controlled by the automatically operated apparatus.

The dilution is particularly effective when the fuels in the pipeline are not gasolines. Kerosenes and domestic fuel oils and the like are frequently shipped through such lines, and the standard test engine will not operate or will not operate well on such fuels when fed to the engine in undiluted condition. On the other hand, dilution with ten to twenty times their volume of a standard gasoline will enable such heavy fuels to be propely burnt in the test engine without masking any interfaces in which they are involved.

Dilution of the sampling stream also has the advantage of keeping the fuel supply burnt by the engine in a relatively narrow range of octane ratings. Such a range can be effectively used if as little as 5 octane numbers wide, and enables better interface control.

In the standard test engines, changes in compression ratio are less effective with low compression fuels than with high compression fuels. Accordingly, when operating at low compression ratios it is desirable to have the interface diversion triggered by at least four seconds operation of the compression ratio adjuster. On the other hand, when operating at high compression ratios it is desirable to have the diversion triggered by two seconds of such operation. Both such triggerings are readily arranged by providing a variable resistance in the timing circuit and having the resistance varied by the compression ratio adjuster so that it gives a higher time constant (RC) timing circuit at low compressions. However, no such triggering variation is needed where the dilution described above is used to keep the carburetted fuel within a range of up to about 10 research octane numbers.

The response to the interface can be shortened by using knock intensity signals, rather than compression ratio signals to control the pipeline diversion. The knock intensity signals are shown on a voltmeter and very little lag is involved. As soon as the voltmeter needle suffers a material change, generally at least 5% of the standard knock intensity voltage, the pipeline diversion can be initiated. A photoelectric cell arrangement can be used with the voltmeter needle interrupting a light beam when it moves away from a base position corresponding to the pipeline contents ahead of the interface. Alternatively, the swings of the needle can be followed by intermittently pressing the needle in a direction parallel to its axis of rotation, against a set of contacts to determine whether the needle has swung far enough to make engagement with a contact. Such an arrangement is illustrated in FIG. 9 of Ser. No. 205,015. An automatic compression ratio adjuster can also be used and operated periodically to return the voltmeter to or near standard knock intensity and thus keep from damaging the equipment as by movement of the needle off the voltmeter scale or operation of the engine with excessive knock.

It is not necessary to use the apparatus of the present invention for responding to interfaces involving fuel oils, kerosene or the like. Such interfaces can be detected with other types of equipment. By using the apparatus of the present invention only for gasoline/gasoline interfaces, it can be further simplified. No supply of standard fuel is then needed and such standard fuel supply when used generally requires a fuel that does not change in composition as by reason of very low volatility or by having the standard fuel consist of a pure compound like isooctane (2,2,4-trimethylpentane). Moreover, the interface diversion can also be eliminated, the interface then being combined with either the downstream or upstream gasoline, whichever is the less critical grade. There is no real problem with interfaces between two very critical grades such as low octane aviation gasoline and high octane automobile gasoline, inasmuch as very little aviation gasoline is sent through pipelines.

The apparatus as thus simplified can have a remotely operated supplemental control that determines whether the pipeline diversion shift takes place at the interface beginning or end. Alternatively the apparatus can be automatically converted to shift the diversion only when the knock intensity increases or stops decreasing. The diversion shift can also include a limit switch that shuts down the test engine.

Where the automatic fuel-air ratio adjustment feature is retained in the construction of FIG. 1 and the proportioning mixer is used, the test engine can also be operated for the purpose of monitoring the octane rating of the fuel flowing through the pipeline. In some cases it is desirable to monitor fuel by checking on both its research octane number and its motor octane number, rather than either alone, although for pipeline diversion the knock controls can respond to engine operation under either research or motor number condition. These conditions are described in the 1960 ASTM Manual for Rating Fuels by Motor and Research Methods published by the American Society for Testing and Materials. According to the present invention simultaneous research and motor octane monitoring is readily effected by using two test engines simultaneously.

The construction of FIG. 2 illustrates such an arrangement in which the conduit 110, such as a pipeline or refinery stock line or the like, is provided with sampling line 112 that delivers samples of the conduit's contents simultaneously to two different test engines 131 and 132. Each of these test engines can be of the type described in the above-identified patent applications but one of the engines can be set to operate under conditions used for determining research octane numbers while the other for motor octane numbers. It is possible to use a single engine for both examinations, but inasmuch as substantial time is required to change the engine from one type of operation to the other, the readings provided this way would be made on fuel samples quite far apart in the pipeline stream. The time difference can be diminished by departing somewhat from the prescribed engine conditions, as by fixing the ignition timing and engine speed at some intermediate values and only shifting the mixture heating. Thus a 19 degree before top center ignition timing and a 700 r.p.m. engine speed can be used to give approximate research and motor numbers.

A feature of the combination of FIG. 2 is that, as pointed out above, not only can the respective test engines be used to give simultaneous octane number determinations on reading indicators 141, 142 respectively, but a computer 143 can be provided and very simply connected to receive both research and octane number readings and convert them to a road index value that can be separately read at the same time. The road index value determination is much more indicative of the operating characteristics of gasoline than either the research or motor octane numbers. Road index values have been compiled by correlating the reasearch and motor octane numbers, and is a much better standard for a supplier of gasoline.

The combination of FIG. 2 can also be used to automatically adjust the research or motor octane number or road index of gasoline flowing through conduit 110. For this purpose there is provided a blending unit 151 operated by the compression ratio adjuster for engine 131, and a separate blending unit 152 for operation by the compression ratio adjuster of engine 132. Each blending unit can be constructed in the manner indicated in the above-identified patent applications, but each blending unit supplies a different additive to the gasoline. Where engine 131 is operated under research octane number determining conditions, additive I is preferably tetraethyllead or a fixed lead alkyl antiknock fluid. Engine 132 can be operated under motor octane number determining conditions and is preferably arranged to blend an additive which is a gasoline stock that has a high motor octane number. Streams of alkylate, light hydrocrackate, natural gasoline or light straight run, make suitable additives for blending by unit 152. With some gasolines tetramethyl-lead antiknock fluid is more effective to increase motor octane numbers and would then be the additive supplied by blending unit 152.

When used for blending, the apparatus of FIG. 2 has the flow in conduit 110 from right to left, so that the sampling takes place downstream of the blending.

The apparatus of FIG. 2 can also be used to provide a convenient and quick checking technique for determining optimum proportions of two different types of additives to be blended in the gasoline. Thus, at the present time there is extensively used tetra-alkylleads of various different compositions ranging from some in which all the alkyls are ethyl, others in which they are all methyl, and still others in which they are a mixture of methyl and ethyl in various proportions. The different materials will have somewhat different effects on the gasoline, and these effects are even further varied when the gasoline composition is changed. Thus, it can be readily determined whether it is desirable for a manufacturer to use the more expensive tetramethyllead in addition to the less expensive tetraethyllead, as by running the test gasoline through the apparatus of FIG. 2 with test engine 131 operated under research octane number determining conditions and supplying tetraethyllead while engine 132 operates under motor octane number determining conditions and blends tetramethyllead with the gasoline. The engines can then be operated to determine the effects of incremental concentrations of each additive separately and together. In a similar way the combination of FIG. 2 can also be used to determine the effects of blending various stocks with or without antiknock additive.

Another blending control is provided by having the construction of FIG. 2 using the output of computer 143 to control the addition of an additive. The mixed methyl-ethyl lead type of lead alkyl antiknock fluid is particularly suited for blending in this manner.

Obviously many modifications and variations of the present invention are possible in the light of the above teachings. For example, the pipeline control apparatus of FIG. 1 can include a storage battery which is used for starting the test engine, and the test engine can be coupled to a generator connected to charge the battery when the engine is running. This arrangement is particularly suitable for use where standard electric power is not available. To keep from discharging the storage battery because the apparatus is not called upon to operate for an extended period, a timer can be provided to start up and run the test engine for a suitable time every week or so. Another modification of the apparatus of FIG. 1 has a plurality of diversion valves each operated by a different motor with suitable switching and limit stops to effect any desired diversion. It is, therefore, to be understood that within the scope of the appended claims the invention may be practiced otherwise than as specifically described.

What is claimed is:

1. An automatic pipeline control having (a) automatic knock-measuring apparatus including a test engine, (b) remotely controlled starting means for the engine, (c) valve-operating structure connected to the knock-measuring apparatus for such measurements, and (d) the pipeline in response to such measurements, and (d) automatic engine stopping means connected to the engine to stop the engine in response to alternate operations of the valve-operating structure.

2. Automatic octane rating apparatus having (1) test engine means connected to automatically provide research octane number measurements as well as motor octane number measurements, and (2) a computer connected to derive a road octane index value from said measurements.

3. Automatic gasoline blending apparatus having test engine means connected to control the mixture of antiknock ingredients into a gasoline blend, said means including a first test engine connected to a first blender to adjust the research octane number of the blend and a second test engine connected to a second blender to adjust the motor octane number of the blend.

4. The combination of claim 3 in which the first test engine is connected to control the mixing of an antiknock additive with the blend, and the second test engine is connected to control the mixing with the blend of a gasoline stock that has a high motor octane number.

5. The combination of claim 3 in which one test engine is connected to mix one antiknock additive with the blend, and the other test engine is connected to mix a different anti-knock additive with the blend.

6. An automatic pipeline control having automatic knock-measuring apparatus including a test engine, the engine having fuel mixture induction elements with proportioning means connected to receive fuel from a pipeline, mix that fuel with a uniform amount of a standard fuel, and supply the mixed fuel to the engine.

7. In the process of controlling the flow of fuels in a remote pipeline, the improvement according to which the fuel in the pipeline is monitored by automatically mixing a sample of the fuel in a predetermined ratio with a standard fuel at the pipeline site, automatically determining at the pipeline site the relative knock characteristics of the mixture, and controlling pipeline flow diversions in response to changes in said characteristics.

8. The combination of claim 7 in which the standard fuel has a relatively low volatility.

9. The combination of claim 7 in which the standard fuel is an essentially pure compound.

10. The combination of claim 2 in which the test engine means includes two test engines, one connected to supply research octane number measurements and the other to simultaneously supply motor octane number measurements.

11. The combination of claim 2 in which the test engine means has a single test engine connected to operate at an engine speed and ignition timing intermediate between the research and motor octane measuring standards.

References Cited

UNITED STATES PATENTS

| | | | |
|---|---|---|---|
| 2,859,757 | 11/1958 | Parsons | 137—93 XR |
| 3,238,765 | 3/1966 | Beal | 73—35 |
| 3,312,102 | 4/1967 | Traver | 73—35 |

OTHER REFERENCES

Butler: "Automatic Blending Lives Up To Goal," Petroleum Refiner, vol. 39, No. 8, August 1960, pp. 97–100.

Sisk: "Automation For Gas Blending," Oil and Gas Journal, June 20, 1960, vol. 58, No. 25, pp. 108–111.

PATRICK P. GARVIN, Primary Examiner

U.S. Cl. X.R.

73—35; 137—88, 93

PO-1050
(5/69)

UNITED STATES PATENT OFFICE
CERTIFICATE OF CORRECTION

Patent No. 3,488,168   Dated January 6, 1970

Inventor(s) William C. Ludt, John T. Jones, & Warren E. Green

It is certified that error appears in the above-identified patent and that said Letters Patent are hereby corrected as shown below:

Column 1, after title, inventor's name reads, "Jonn T. Jones", should read -- John T. Jones --. Column 2, line 27, reads "1953", should read -- 1963 --; Column 2, line 38, reads "motor", should read -- motors --. Column 5, line 54, reads "propely", should read -- properly --. Column 7, line 38, reads "fixed", should read -- mixed --. Column 8, line 29, delete "such measurements, and (d)". Column 8, line 29, after "apparatus for" add -- operating a diverting valve in --. Column 8, line 41, reads "mixture", should read -- mixing --; Column 8, lines 42 and 43 read "includig", should read -- including --.

SIGNED AND
SEALED
JUL 28 1970

(SEAL)
Attest:

Edward M. Fletcher, Jr.
Attesting Officer

WILLIAM E. SCHUYLER, JR.
Commissioner of Patents